(12) United States Patent
Hirata

(10) Patent No.: US 7,685,072 B2
(45) Date of Patent: Mar. 23, 2010

(54) SOFTWARE DISTRIBUTION SYSTEM FOR SEWING MACHINE, SEWING MACHINE AND STORAGE MEDIUM

(75) Inventor: Takashi Hirata, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 204 days.

(21) Appl. No.: 11/896,713

(22) Filed: Sep. 5, 2007

(65) Prior Publication Data

US 2008/0065549 A1 Mar. 13, 2008

(30) Foreign Application Priority Data

Sep. 13, 2006 (JP) .............................. 2006-247753
Jul. 3, 2007 (JP) .............................. 2007-175003

(51) Int. Cl.
*G06F 21/00* (2006.01)

(52) U.S. Cl. ................. 705/59; 112/102.5; 112/470.01; 112/470.04; 112/475.19; 112/457; 700/136; 700/137; 700/138; 705/50; 705/51

(58) Field of Classification Search ............ D15/66–78; 700/135–136; 112/102.5, 470.01; 705/50–51, 705/59

See application file for complete search history.

(56) References Cited

U.S. PATENT DOCUMENTS 5,970,894 A * 10/1999 Mase ....................... 112/102.5
6,889,111 B2 * 5/2005 Tomita ....................... 700/138
2005/0021992 A1 * 1/2005 Aida et al. .................. 713/200

FOREIGN PATENT DOCUMENTS

| JP | A 2002-132365 | 5/2002 |
| JP | A 2002-258963 | 9/2002 |
| JP | A 2003-295964 | 10/2003 |
| JP | A 2004-46708 | 2/2004 |

OTHER PUBLICATIONS

Pavliscak et. al. "A microcomputer based system for automated pattern digitization and editing." Aug. 1978. All pages. Retrieved from ACM Portal on Nov. 10, 2009.*
HobbyWare.com. "HobbyWare: Pattern Maker for Cross-Stitch." Nov. 8, 2004. All pages. [URL: http://www.hobbyware.com/pm.htm].*

* cited by examiner

*Primary Examiner*—Evens J. Augustin
*Assistant Examiner*—Calvin K Cheung
(74) *Attorney, Agent, or Firm*—Oliff & Berridge, PLC

(57) ABSTRACT

A software distribution system for sewing machine includes a server and a sewing machine. The server generates authentication key data dedicated for a sewing machine only upon initial transmission of medium identification data and sewing machine identification data from a terminal and stores the authentication key data in mapping with the medium identification data. If a valid medium identification data and an invalid sewing machine identification data are thereafter transmitted to the server, the stored data is not updated and the authentication key data is transmitted to the terminal. If determined that a control program transmitted from the terminal is not free of charge based on a version information thereof, calculated identification data corresponding to the sewing machine identification data is generated based on the authentication key data transmitted from the server, whereupon successful verification of calculated identification data with the sewing machine identification data, the control program is invoked.

14 Claims, 6 Drawing Sheets

US 7,685,072 B2

SOFTWARE DISTRIBUTION SYSTEM FOR SEWING MACHINE, SEWING MACHINE AND STORAGE MEDIUM

This application is based upon and claims the benefit of priority from the prior Japanese Patent Application 2006-247753, filed on, Sep. 13, 2006 and 2007-175003, filed on Jul. 3, 2007, the entire contents of which are incorporated herein by reference.

FIELD

The present disclosure is directed to a software distribution system for a sewing machine that prevents unauthorized free use of a sewing machine control program sold in the form of a storage medium by users who have not purchased the program. The present disclosure is also directed to a sewing machine and a storage medium for use with the software distribution system.

BACKGROUND

Conventionally, software distribution systems have been provided that allow electronic data distributed in the form of a CD-ROM purchased by the user to be downloaded to the user's (client) terminal, in other words, a personal computer. In such systems, various technologies have been suggested to prevent unauthorized use of distributed data by users who have not purchased the CD-ROM.

For example, pages 8 to 12 and FIG. 2 of JP 2002-132365 A (hereinafter referred to as patent document 1) discloses an electronic data distribution management system (electronic data distribution management unit) in which "authentication code", "software type", and "amount" are transmitted to a software management server from a web server when "user specific information" and "software request information" are transmitted to the web server from the client terminal. Then, an e-mail with an attachment file containing software embedded with authentication code management module is sent to a mail server. Thereafter, when the client terminal attempts to retrieve e-mails from the mail server, the e-mail with the attachment file is sent to the client terminal from the mail server. Thus, even if unauthorized third person who did not purchase the electronic data acquires the software, in other words, the electronic data, such user will not be able to use the software despite acquisition of valid authentication code since encryption code is arranged to vary depending on when data encryption was executed.

A control program that prevents unauthorized copying of software products is disclosed in pages 7 to 9 and FIG. 2 of JP 2002-258963 A (hereinafter referred to as patent document 2). The disclosed control program generates user ID and password for entering online shopping sites to unauthorized users as well. Authorized users are allowed to shop or utilize other services by using the credit awarded as authorized user privileges. However, if an authorized user allows an unauthorized user to use his/her credit, the authorized user who is the original proprietor of such privileges is penalized by being denied further use of the credit.

As described earlier, patent document 1 discloses a technology that prevents unauthorized use in an electronic data distribution management system in which electronic data requested by the client terminal is sent to the client terminal from the server; whereas patent document 2 discloses a technology that prevents unauthorized use in a control program for preventing unauthorized copy of software products in which the authorized user him/herself is psychologically pressured so as not to allow unauthorized use by penalizing the authorized user for permission of unauthorized use.

Nowadays, sewing systems have been suggested in which terminals are connected to various types of sewing machines and sewing operation is executed by sending sewing data to the sewing machines from the terminals. The same approach is employed when updating the version of the control program used in controlling the drive of the sewing machine. To describe specifically, an update control program provided in the form of a CD-ROM is transmitted to the sewing machine from the terminal to render the program update to take place in the sewing machine.

In such case, the technologies disclosed in patent documents 1 and 2 for preventing unauthorized use are ineffective in preventing unauthorized execution of the update control program on the sewing machine. Thus, it is not possible to prevent unauthorized third-party use of the update control program provided in the form of a CD-ROM. This becomes a significant risk factor especially when the update program is not free of charge. In such instances, the developer of the update control program will not be able to collect its expense.

SUMMARY

An object of the present disclosure is to disallow unauthorized use of a sewing machine control program to prevent negative impact on developer's revenue.

According to a first exemplary embodiment, a software distribution system for sewing machine includes a server connected to a communication line; a terminal that transmits and receives various data to and from the server via the communication line; a storage medium attachable to the terminal and that stores a sewing machine control program and medium identification data; a sewing machine capable of transmitting and receiving data to and from the terminal and having a sewing machine controller that stores sewing machine identification data; an authentication key data generator provided in the server and generating authentication key data dedicated to the sewing machine identification data based on the medium identification data and the sewing machine identification data transmitted from the terminal only upon initial transmission of the medium identification data and the sewing machine identification data, and that stores the authentication key data in mapping with the medium identification data in the authentication key data storage, whereafter upon transmission of medium identification data identical with existing medium identification data and sewing machine identification data different from existing sewing machine identification data, retaining data stored in an authentication key data storage without update; a determiner provided in the sewing machine controller and that determines whether or not the sewing machine control program received from the terminal is free of charge based on version information of the sewing machine control program; a verifier provided in the sewing machine controller and that, upon receiving a determination result indicating that the sewing machine control program is not free of charge from the determiner, generates calculated identification data corresponding to the sewing machine identification data based on the authentication key data transmitted from the authentication key data storage of the server to the terminal and verifies the calculated identification data with the sewing machine identification data stored in the sewing machine controller; and an invoker provided in the sewing machine controller and that invokes the sewing machine control program loaded from the storage medium via the terminal when receiving a verification result from the verifier indicative of consistency between the calculated identification data and the sewing machine identification data.

According to the software distribution system for sewing machine, the authentication key data generator provided in the server generates authentication key data dedicated for the sewing machine identification data based on the medium identification data and the sewing machine identification data transmitted from the terminal only when the aforementioned identification data is transmitted for the first time. The generated authentication key data is then associated with the medium identification data and stored in the authentication key data storage. Then, the authentication key data generator retains the data in the authentication key data storage without update and transmits the data to the terminal when medium identification data identical to the existing medium identification data and sewing machine identification data different from the existing sewing machine identification data has been transmitted.

The determiner provided in the sewing machine controller determines whether or not the sewing machine control program is free of charge based on the version information of the sewing machine control program contained in the medium identification data received from the terminal. When receiving a determination result indicating that the sewing machine control program is not free of charge from the determiner; the verifier provided in the sewing machine controller receives the authentication key data transmitted to the terminal from the authentication key data storage of the server. Then, the verifier generates calculated identification data corresponding to the sewing machine identification data based on the authentication key data and verifies the calculated identification data with the sewing machine identification data stored in the sewing machine controller. Thereafter, upon receipt of a verification result indicating that the calculated identification data and the sewing machine identification data match, the invoker provided in the sewing machine controller invokes the sewing machine control program loaded from the medium via the terminal.

However, in case an unauthorized user who did not purchase the storage medium borrows the storage medium from the authorized user, the medium identification data of the borrowed storage medium is already registered to the server. Thus, the sewing machine identification data reproduced by calculating the authentication key data transmitted from the server indicates the sewing machine identification data of the original user which does not match the sewing machine identification data owned by the unauthorized user, in effect prohibiting the use of the sewing machine control program by unauthorized user.

According to a second exemplary embodiment, a sewing machine includes a sewing machine controller capable of transmitting and receiving data to and from a terminal and that stores sewing machine identification data; a determiner provided in the sewing machine controller and that determines whether or not a sewing machine control program received from the terminal is free of charge based on version information of the sewing machine control program; a verifier provided in the sewing machine controller and that, upon receiving a determination result indicating that the sewing machine control program is not free of, charge from the determiner, generates calculated identification data corresponding to the sewing machine identification data based on authentication key data transmitted from the terminal and verifies the calculated identification data with sewing machine identification data stored in the sewing machine controller; and an invoker provided in the sewing machine controller and that invokes the sewing machine control program loaded via the terminal when receiving a verification result from the verifier indicative of consistency between the calculated identification data and the sewing machine identification data.

The above described sewing machine provides the same operation effects as the first exemplary embodiment.

According to a third exemplary embodiment, a storage medium is provided with a software program including a determining routine of determining whether or not a sewing machine control program received from the terminal is free of charge based on version information of the sewing machine control program; a verifying routine of, upon receiving a determination result indicating that the sewing machine control program is not free of charge from the determining routine, generating calculated identification data corresponding to the sewing machine identification data based on authentication key data and verifying the calculated identification data with sewing machine identification data; and an invoking routine of invoking the sewing machine control program loaded via the terminal when receiving a verification result from the verifying routine indicative of consistency between the calculated identification data and the sewing machine identification data.

The above described medium yields the same operation and effects as the first exemplary embodiment by executing the program by loading the stored program to the computer of the sewing machine.

BRIEF DESCRIPTION OF THE DRAWINGS

Other objects, features and advantages of the present disclosure will become clear upon reviewing the following description of the illustrative aspects with reference to the accompanying drawings, in which.

DETAILED DESCRIPTION

The software distribution system for a sewing machine of the present exemplary embodiment bundles and stores a CD key of a CD-ROM including a sewing machine control program, a sewing machine NO of a sewing machine owned by an authorized user who purchased the CD-ROM, and authentication key data generated based on a sewing machine NO to a web server. In case an unauthorized user who did not purchase the CD-ROM requests for the authentication key data, the authentication key data for the authorized user is provided to the unauthorized user so that the sewing machine of the unauthorized user cannot be invoked due to invalid sewing machine NO, thereby preventing unauthorized use.

Figure 1:
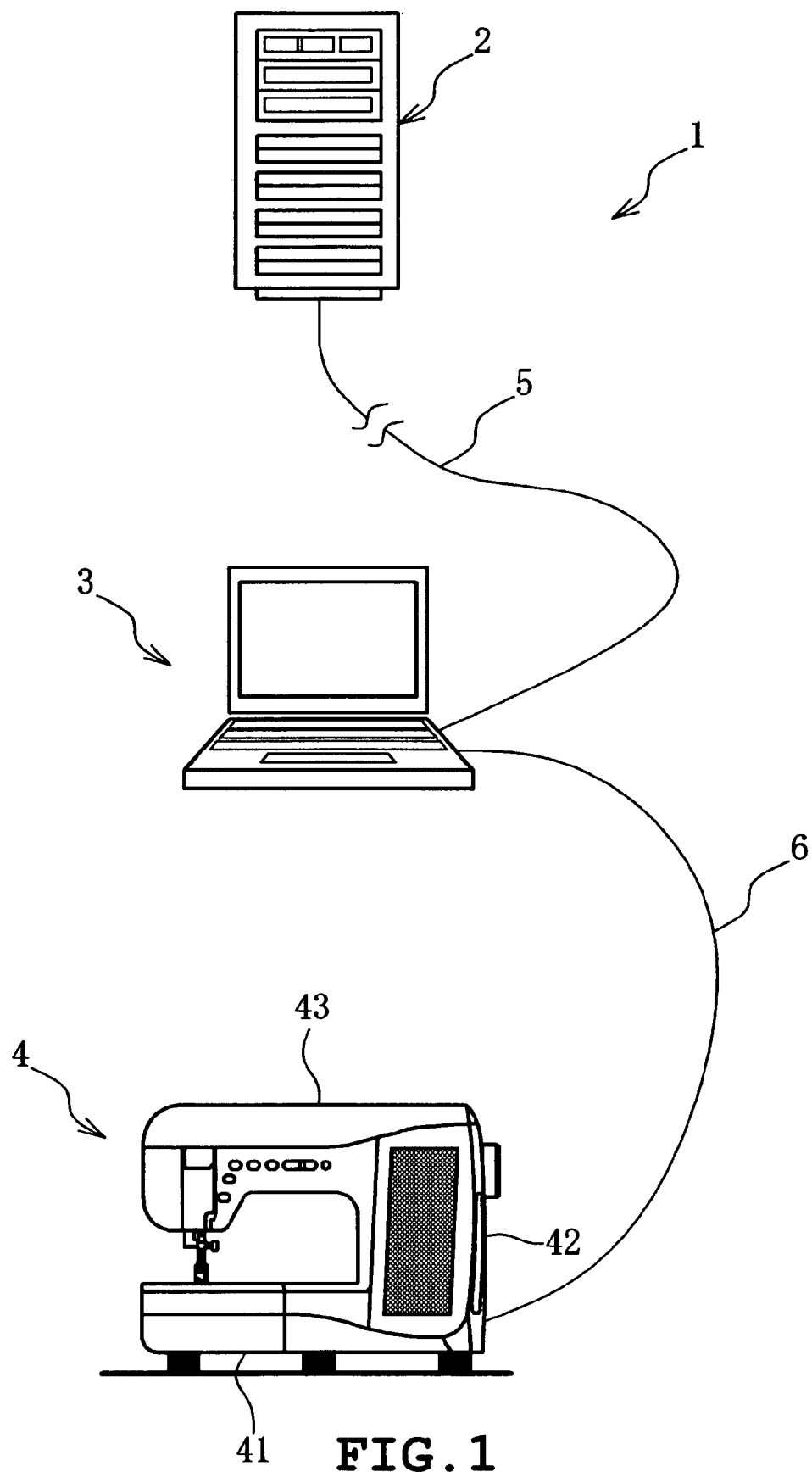
FIG. 1 is a schematic configuration of a software distribution system for a sewing machine of the present disclosure.

An overview of a software distribution system 1 for sewing machine (hereinafter simply referred to as software distribution system 1) is given hereinafter. Referring to FIG. 1, the software distribution system 1 includes a web server 2 provided on a network; a personal computer 3 (hereinafter simply referred to as computer) connected to the web server 2 via a communication line 5 such as the internet; and a sewing machine 4 capable of executing a sewing operation connected to the computer 3 by a connection cord 6.

Figure 2:
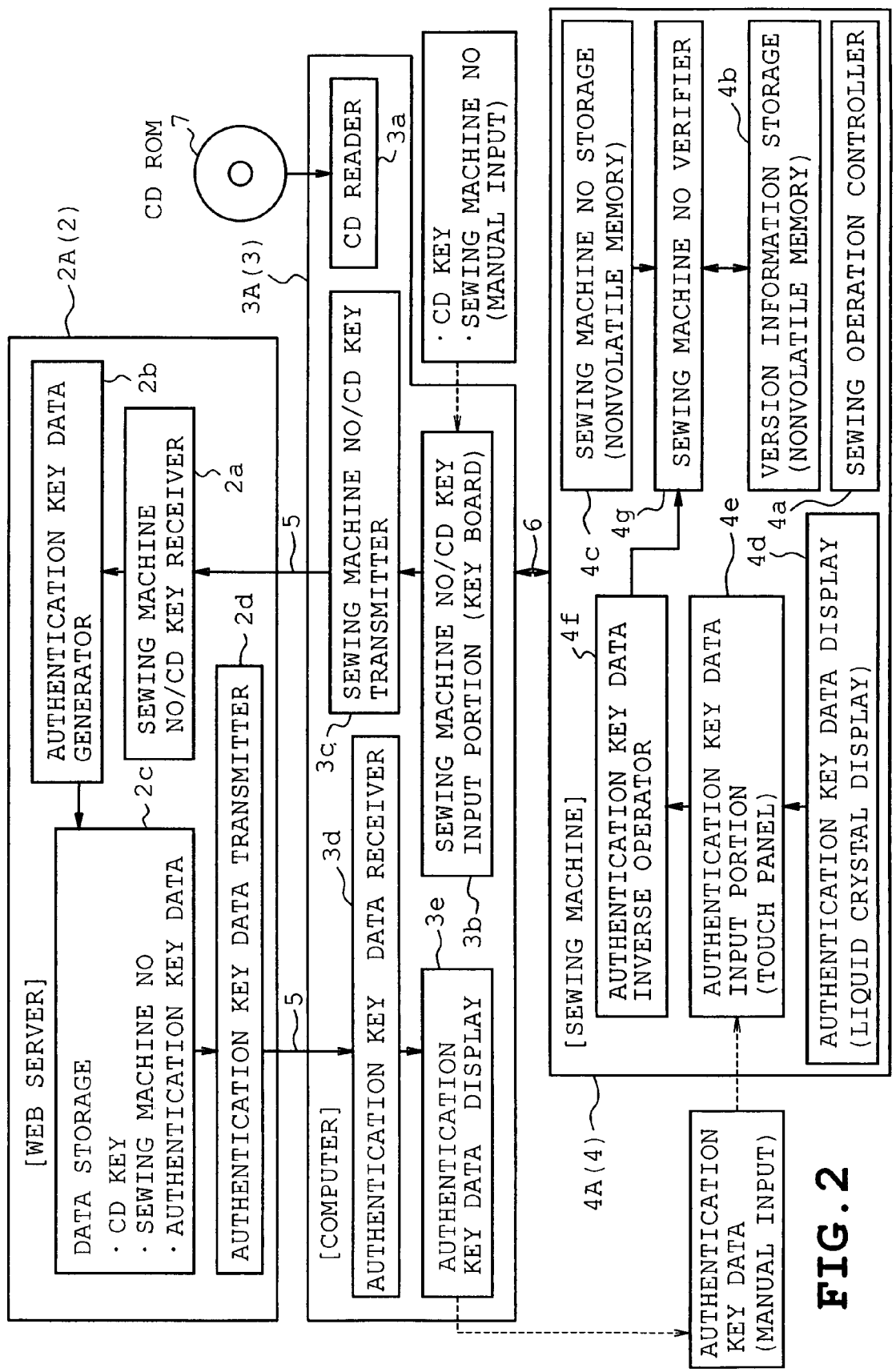
FIG. 2 is a functional block diagram of a web server, a computer and a sewing machine.

As illustrated in FIG. 1, the web server 2 is composed of a large-scale computer, and is capable of communicating with the computer 3 accessing the web server 2 by URL via the communication line 5. Referring to FIG. 2, a web server controller 2A includes a receiver 2a, an authentication key data generator 2b, a data storage 2c, and an authentication key data transmitter 2d. The receiver 2a receives "sewing machine NO (manufacturing serial number, for example)" transmitted by the computer 3, and "CD key" specific to a CD-ROM 7. The authentication key data generator 2b generates "authentication key data" based on "sewing machine NO" by calculation. The data storage 2c stores authentication information bundling the "CD key", the "sewing machine NO" and the "authentication key data". The authentication key data transmitter 2d sends "authentication key data" to the computer 3.

As illustrated in FIG. 1, the computer 3 is connected to the web server 2 via the communication line 5. As illustrated in FIG. 2, the computer controller 3A includes a CD reader 3a, an input portion 3b, a transmitter 3c, an authentication key data receiver 3d, and an authentication key data display 3e. The CD reader 3a is capable of reading the information stored in the CD-ROM 7 when the CD-ROM 7 is mounted on the CD reader 3a. The input portion 3b is composed of a key board and allows user input of information such as "sewing machine NO" and "CD key". The transmitter 3c transmits the "sewing machine NO" and the "CD key" to the web server 2. The authentication key data receiver 3d receives the "authentication key data" transmitted from the web server 2. The authentication key data display 3e displays the "authentication key data" received by the authentication key data receiver 3d.

The CD-ROM 7 stores the "sewing machine control program", the "version information", and the "CD key". The version information determines whether or not the sewing machine control program is free of charge and is represented in the format of "Va.bc". Of note is that "a, b, and c" in lower case are numeric, and thus, the version information is represented as "V1.00" and "V2.00", for example. The CD-ROMs 7 may have the same version information but each has a unique CD key.

In case the CD-ROM 7 is not free of charge, and the sewing machine control program stored in the CD-ROM 7 is updated, the version information is updated sequentially to "V2.00", "V3.00", "V4.00" and so on. However, free updates for removing defects, etc. are updated such that "V2.00" is updated to "V2.01" and "V3.00" is updated to "V3.01".

The CD-ROM 7 which is not free of charge contains various optional applications supporting the latest functions such as a "mouse function", a "USB memory function" and a "cloth presser vertically moving function" on a required basis.

A brief description will now be given on the "mouse function". If a USB terminal (Universal Serial Bus terminal) is provided on the external cover of the sewing machine 4 as an optional provision, a plurality of indications of "function name" and editable "numeric" in the range of 0 to 9 displayed on the liquid crystal display may be specified by an "arrow pointer" which is moved by mouse operation.

A brief description will be given on the "USB memory function". A USB memory unit may be connected to the USB terminal to store the sewing data stored in the sewing machine controller 4A and likewise load the sewing data stored in the USB memory to store it into the nonvolatile memory of the sewing machine controller 4A.

A brief description will now be given on the "cloth presser vertically moving function". The sewing machine 4 lowers the presser foot (not shown) when starting a sewing operation and raises the presser foot when stopping the sewing operation.

As illustrated in FIG. 1, the sewing machine 4 includes a bed 41 having a rotary shuttle mechanism; a pillar 42 having a liquid crystal display; and an arm 43 having a needle-bar vertically driving mechanism. The sewing machine 4 is electrically connected to the computer 3 via the connection cord 6.

As illustrated in FIG. 2, the sewing machine controller 4A includes a sewing controller 4a; a version information storage 4b; a sewing machine NO storage 4c; an authentication key data display 4d; an authentication key data input portion 4e; an authentication key data inverse operator 4f; and a sewing machine NO verifier 4g. The version information storage 4b is composed of a nonvolatile memory and stores the latest information upon every update of the version information of the sewing machine control program. The sewing machine NO storage 4c is also composed of a nonvolatile memory and stores the "sewing machine NO". The authentication key data display 4d is composed of a liquid crystal display and displays an input screen allowing input of the authentication key data. The authentication key data input portion 4e is composed of a transparent touch panel and allows user input of the authentication key data. The authentication key data inverse operator 4f generates calculated identification data from the authentication key data. The sewing machine NO verifier 4g verifies the calculated identification data generated by the authentication key data inverse operator 4f with the sewing machine NO.

Figure 3:
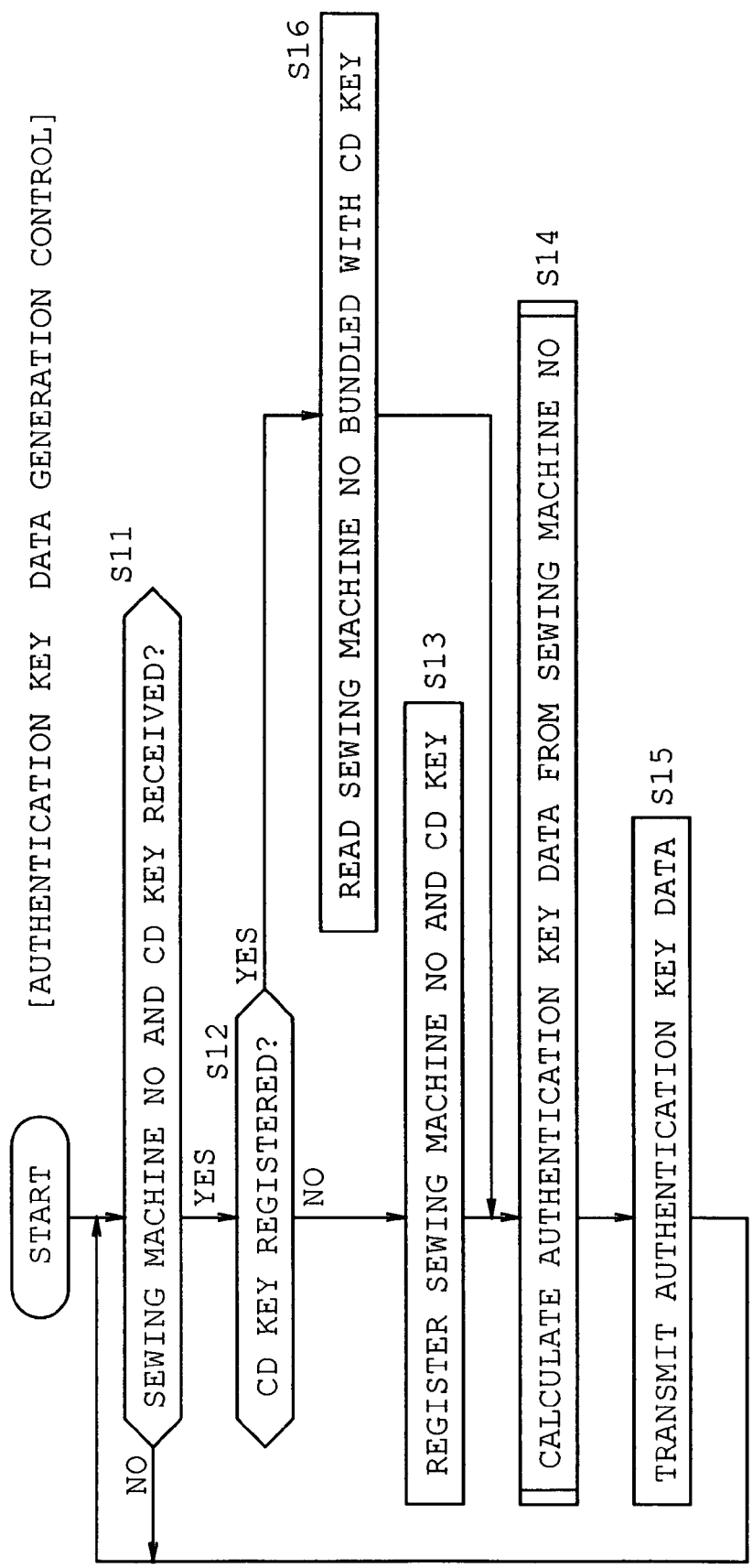
FIG. 3 is a flowchart of a control that generates authentication key data.

Next, an authentication key data generation control executed by the web server controller 2A will be described with reference to the flowchart in FIG. 3. Reference symbols Si (i=11, 12, 13 . . . ) indicate each step of the control.

The web server controller 2A repeats authentication key data generation control at small time intervals. When the web server controller 2A receives the sewing machine NO and the CD key from the computer 3 (S11: Yes), and in case the received CD key is not registered (S12: No), the transmitted sewing machine NO and the CD key are bundled and registered (S13).

Figure 4:
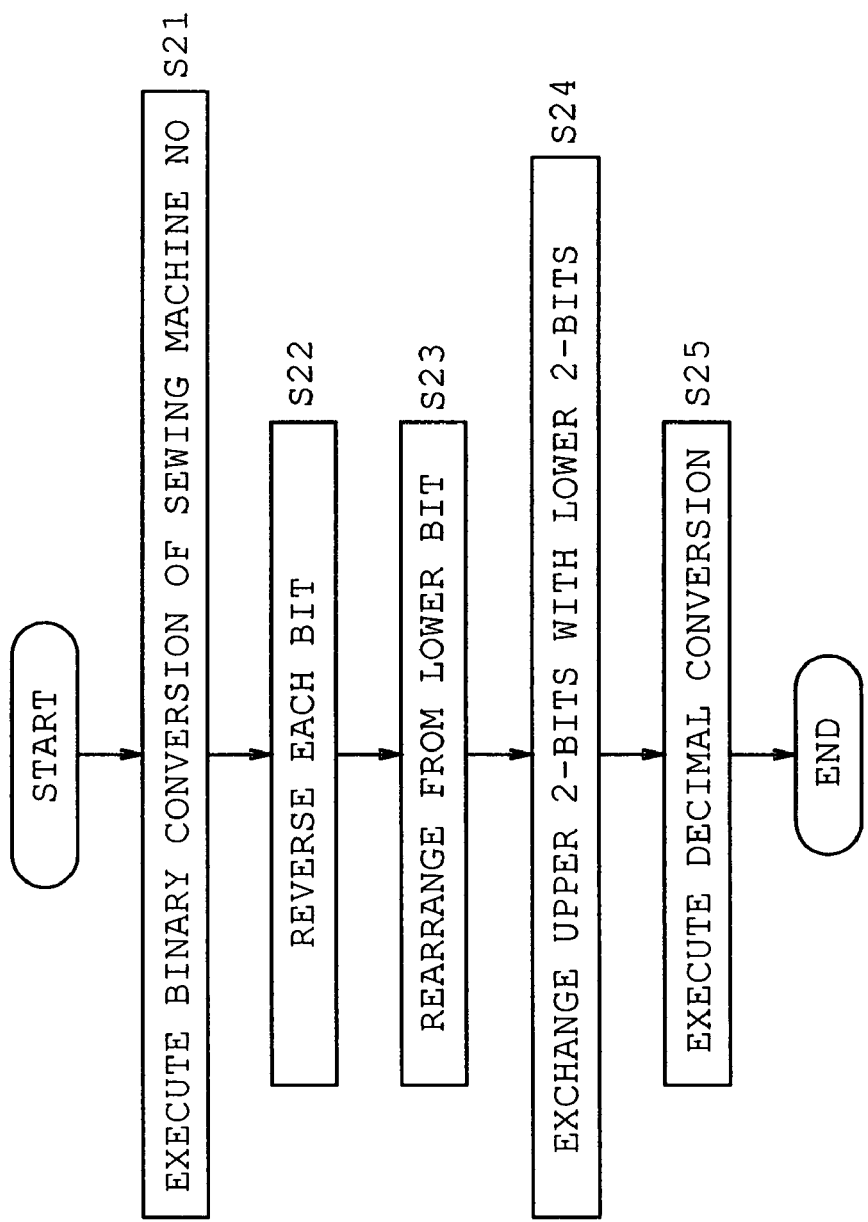
FIG. 4 is a flowchart of a control that calculates authentication key data.

Then, the web server controller 2A calculates the authentication key data based on the received sewing machine NO by a predetermined authentication key data calculation control (refer to FIG. 4) (S14). When the web server controller 2A starts the control, first, the sewing machine NO is converted to a binary number of predetermined bits (4 bits, for example) (S21) and each bit of the binary number is reversed (S22). In other words, a "0" bit is converted to "1" bit and "1" bit is converted to a "0" bit.

Next, the web server controller 2A rearranges predetermined bits of the binary number so that the lower bits and the upper bits are placed in reverse order (S23), whereby the upper 2 bits and the lower 2 bits of the 4 bits are replaced by the other (S24). Then, the web server controller 2A ultimately converts the rearranged binary number into a decimal number (S25). Thereafter, the web server controller 2A transmits the authentication key data obtained in S14 to the computer 3 (S15).

Figure 5:
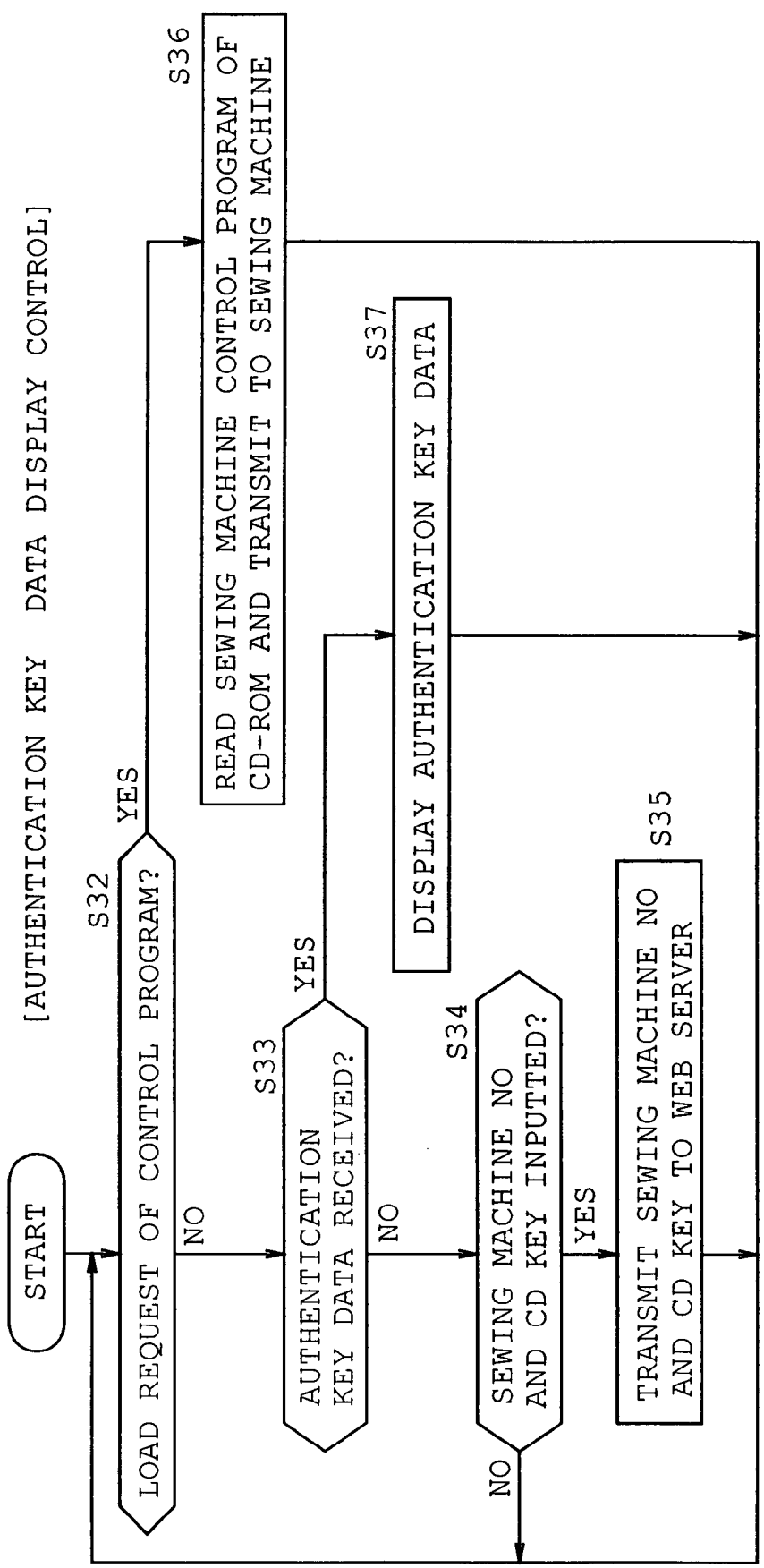
FIG. 5 is a flowchart of a control that displays authentication key data.

Next, an authentication key data display control executed by the computer controller 3A will be described based on the flowchart of FIG. 5.

When the computer controller 3A starts the control, the sewing machine control program of the CD-ROM 7 read by the CD reader 3a is transmitted to the sewing machine controller 4A (S36) upon load request of the control program from the sewing machine controller 4A (S32: Yes).

On the other hand, when the computer controller 3A receives the authentication key data transmitted from the web server 2 (S33: Yes), the received authentication key data is displayed to the authentication key data display 3e (S37). In case the sewing machine NO and the CD key are inputted to the input portion 3b (S34: Yes), the computer controller 3A transmits the sewing machine NO and the CD key to the web server 2 (S35).

Figure 6:
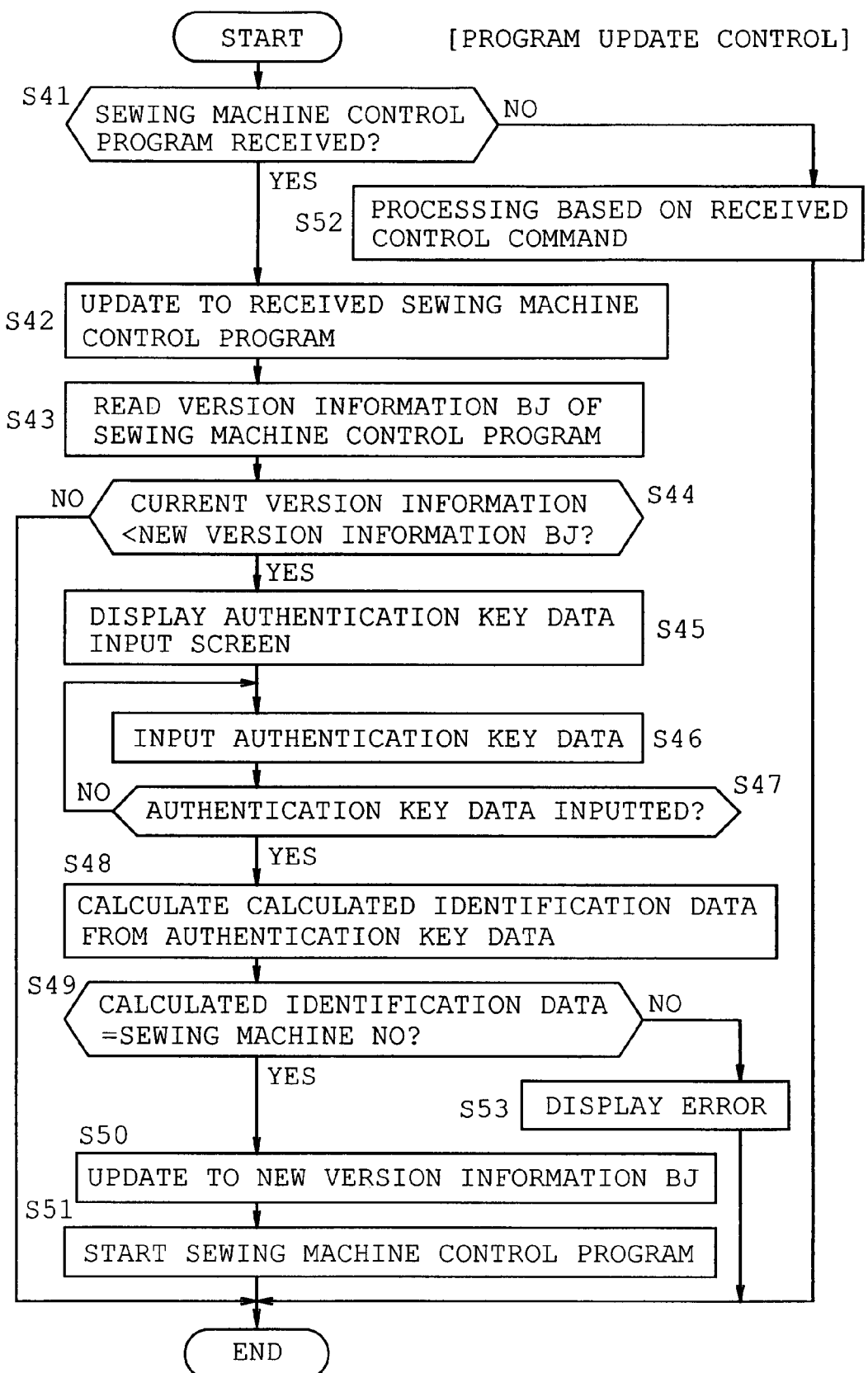
FIG. 6 is a flowchart of a control that controls program update.

Next, the program update control executed by the sewing machine controller 4A will be described with reference to the flowchart in FIG. 6.

When starting the control, in case the sewing machine controller 4A receives the sewing machine control program and the version information BJ from the computer 3 (S41: Yes), the received sewing machine control program is stored in the nonvolatile memory by overwriting the old control program (S42).

Next, the sewing machine controller 4A reads the current version information stored in the version information storage 4b (S43). If the number of the received version information BJ is greater than the number of the current version information, that is, in case the received control program is not free of charge (S44: Yes), an authentication key data input screen is displayed to the authentication key data display 4d (S45). At this time, the user is to input the authentication key data by the authentication key data input portion 4e by referring to the authentication key data displayed on the authentication key data display 3e in S37, or by reading off the authentication key data the user has noted down (S46).

Next, when the authentication key data is inputted by the authentication key data input portion 4e (S47: Yes), the sewing machine controller 4A calculates the calculated identification data based on the authentication key data (S48). The calculated identification data is obtained by the inverse operation process which is the opposite of the authentication key data calculation process indicated in FIG. 4. Next, the sewing machine controller 4A verifies the obtained calculated identification data with the sewing machine NO loaded from the sewing machine NO storage 4c, and if they match (S49: Yes), the new version information BJ is stored by overwriting the version information storage 4b (S50), and the newly updated sewing machine control program is subsequently invoked (S51).

When the sewing machine controller 4A receives a control command other than the sewing machine control program from the computer controller 3A (S41: No), the sewing machine controller 4A executes various process in accordance with the received control command (S52). Otherwise, the sewing machine controller 4A verifies the obtained calculated identification data and the sewing machine NO loaded from the sewing machine NO storage 4c, and if they do not match (S49: No), error is displayed on the liquid crystal display serving as the authentication key data display 4d (S53).

Next, a description will be given on the operation of the software distribution system 1 based on a case where a user A purchases the CD-ROM 7 sold by the manufacturer and updates the user's current sewing machine control program with the sewing machine control program stored in the CD-ROM 7.

First, the user A is to load the new sewing machine control program stored in the CD-ROM 7 to the sewing machine controller 4A by mounting the purchased CD-ROM 7 (version information: V3.00) on to a CD reader 3a of the computer 3. Then, in case the sewing machine NO of the sewing machine 4 in use is "8", for example, and the CD key of the purchased CD-ROM 7 is "BR5", for example, the sewing machine NO "8" and the CD key "BR5" are inputted from the computer 3 connected to the sewing machine 4. The computer 3 then transmits the sewing machine NO "8" and the CD key "BR5" to the web server 2.

Since the received CD key "BR5" is not registered, the web server 2 obtains authentication key data "11" by calculation based on the sewing machine NO "8", and registers the CD key "BR5", the sewing machine NO "8" and the authentication key data "11" as bundled information. Then, the authentication key data "11" is sent to the computer 3. The computer 3, when receiving the authentication key data, displays the authentication key data on the authentication key data display 3e. Thereafter, the user A is to input the displayed authentication key data "11" by the authentication key data input portion 4e via numerical keys composed of touch panels.

The sewing machine controller 4A displays the authentication key data input screen to the authentication key data display 4d in case the version information BJ (V3.00) of the sewing machine control program received from the computer 3 is greater than the current version information (V1.00) and the sewing machine control program is not free of charge. In the above example, the integer number "3" of the version information BJ (V3.00) is greater than the integer number "1" of the current version information (V1.00).

Subsequently, the user A inputs the authentication key data "11" by the authentication key data input portion 4e. Then, the sewing machine controller 4A obtains calculated identification data "8" from the authentication key data "11" by inverse operation. Since the calculated identification data "8" matches the sewing machine NO "8" as the result of verification, the latest sewing machine control program is invoked and the new version information (V3.00) is stored in the version information storage 4b.

On the other hand, in case user B borrows the CD-ROM 7 (version information: V3.00) purchased by user A, obtains the sewing machine NO (12, for example) of the sewing machine 4 used by user B, and inputs the sewing machine NO "12" and the CD key "BR5" from the computer 3 connected to the sewing machine 4 as described earlier, the sewing machine NO "12" and the CD key "BR 5" are transmitted to the web server 2.

Since the received CD key "BR5" is already registered in the web server 2, the authentication key data "11" stored in bundle with the CD key "BR5" is sent to the computer 3. Since the computer 3 displays the authentication key data to the authentication key data display 3e, the user B inputs the authentication key data "11" to the authentication key data input 4e. In such case, the sewing machine controller 4A determines that the sewing machine control program is not free of charge, since number "3" of the version information BJ (V3.00) is greater than number "2" of the current version information (V2.00) stored in the version information storage 4b.

The sewing machine controller 4A further obtains calculated identification data "8" generated based on the authentication key data "11" by inverse operation. The sewing machine controller 4A prohibits invoking of the latest sewing machine control program since the calculated identification data "8" and the sewing machine NO "12" do not match. Thus, unauthorized use by user B who has not purchased the sewing machine control program, as opposed to user A who has purchased the sewing machine control program, can be prevented.

As described above, according to the present embodiment, unauthorized use of the sewing machine control program by an unauthorized user can be prevented reliably; since, when an unauthorized user, who is not a authorized user who has purchased the CD-ROM 7, borrows the CD-ROM 7 from an authorized user in attempt for unauthorized use, the CD key of the borrowed CD-ROM 7 is already registered to the web server 2. Thus, the sewing machine NO reproduced from the authentication key data transmitted from the web server 2 will indicate the sewing machine NO of the sewing machine belonging to the authorized user who is the original owner, and therefore will not match the sewing machine NO of the sewing machine belonging to the unauthorized user. Since the sewing machine control program is not invoked under such conditions, unauthorized use of the sewing machine control program can be prevented reliably. Moreover, prevention of unauthorized use of CD-ROM 7 allows the manufacturers to collect their sales expenses for the CD-ROM 7 without detriment to their sales performance.

Also, whether or not the sewing machine control program is free of charge is determined by comparing the version information BJ of the CD-ROM 7 and the current version information stored in the sewing machine controller 4A. Thus, there is no need to store dedicated information in the CD-ROM 7 to determine whether or not the CD-ROM 7 is free of charge.

Since an input screen for inputting the authentication key data is displayed to the authentication key data display 4d in case it has been determined that the sewing machine control program is not free of charge, the user is allowed to accurately and reliably input the authentication key data via the dedicated authentication key data input screen.

By providing an authentication key data input portion 4e for inputting authentication key data, and an authentication key data inverse operator 4f that calculates the calculated identification data identical to the sewing machine NO based on the authentication key data inputted from the authentication key data input portion 4e, the user is allowed to readily obtain calculated identification data corresponding to the sewing machine NO from the authentication key data.

Furthermore, the user is allowed to readily input the authentication key data by light touch of the fingertips while viewing the authentication key data input screen since the authentication key data input portion 4e is configured by a transparent touch panel disposed in the front side of the liquid crystal display.

Next, partial modifications of the aforementioned embodiment will be described hereinafter.

The authentication key data calculation (refer to FIG. 4) executed by the web server controller 2A described in the above exemplary embodiment in which authentication key data is obtained based on sewing machine NO is merely one example of obtaining the authentication key data. The authentication key data may be obtained by employing various encoding process such as a use of a predetermined encoding number to encode data.

In case an error is displayed due to the user's unauthorized use of the sewing machine control program, the error process may be cancelled to allow invoking of the sewing machine 4 by enabling execution of sewing machine control program of previous versions.

A flexible disc, a DVD, a memory card, and the like, may be employed as the storage medium instead of a CD-ROM.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A software distribution system for a sewing machine, comprising:
    a server connected to a communication line;
    a terminal that transmits and receives various data to and from the server via the communication line;
    a storage medium attachable to the terminal and storing a sewing machine control program and medium identification data; and
    a sewing machine capable of transmitting and receiving data to and from the terminal and having a sewing machine controller that stores sewing machine identification data;
    the server including an authentication key data generator that generates authentication key data dedicated to the sewing machine identification data based on the medium identification data and the sewing machine identification data transmitted from the terminal only upon initial transmission of the medium identification data and the sewing machine identification data, and that stores the authentication key data in mapping with the medium identification data in an authentication key data storage, whereafter upon transmission of medium identification data identical with existing medium identification data and sewing machine identification data different from existing sewing machine identification data, retaining data stored in the authentication key data storage without update;
    the sewing machine controller including:
    a determiner that determines whether or not the sewing machine control program received from the terminal is free of charge based on version information of the sewing machine control program;
    a verifier that, upon receiving a determination result indicating that the sewing machine control program is not free of charge from the determiner, generates calculated identification data corresponding to the sewing machine identification data based on the authentication key data transmitted from the authentication key data storage of the server to the terminal and verifies the calculated identification data with the sewing machine identification data stored in the sewing machine controller; and
    an invoker that invokes the sewing machine control program loaded from the storage medium via the terminal when receiving a verification result from the verifier indicative of consistency between the calculated identification data and the sewing machine identification data.

2. The system of claim 1, wherein the determiner determines whether or not the sewing machine control program is free of charge by comparing the storage medium identification data of the storage medium with the storage medium identification data stored in the sewing machine controller.

3. The system of claim 2, further comprising a display controller that controls a display provided in the sewing machine to display an authentication key data input screen for inputting authentication key data when the determiner determines that the sewing machine control program is not free of charge.

4. The system of claim 1, wherein:
    the verifier includes an input unit that inputs the authentication key data; and the sewing machine controller calculates the calculated identification data, that is identical to the sewing machine identification data, based on the authentication key data inputted from the input unit.

5. The system of claim 4, wherein the input unit is composed of a transparent touch panel disposed in a front face of the display.

6. A sewing machine, comprising:
a sewing machine controller capable of transmitting and receiving data to and from a terminal and that stores sewing machine identification data, the sewing machine controller includes:
a determiner that determines whether or not a sewing machine control program received from the terminal is free of charge based on version information of the sewing machine control program;
a verifier that, upon receiving a determination result indicating that the sewing machine control program is not free of charge from the determiner, generates calculated identification data corresponding to the sewing machine identification data based on authentication key data transmitted from the terminal and verifies the calculated identification data with sewing machine identification data stored in the sewing machine controller; and
an invoker that invokes the sewing machine control program loaded via the terminal when receiving a verification result from the verifier indicative of consistency between the calculated identification data and the sewing machine identification data.

7. The sewing machine of claim 6, wherein the determiner determines whether or not the sewing machine control program is free of charge by comparing medium identification data received from the terminal with the medium identification data stored in the sewing machine controller.

8. The sewing machine of claim 7, further comprising a display controller that controls a display provided in the sewing machine to display an authentication key data input screen for inputting the authentication key data when the determiner determines that the sewing machine control program is not free of charge.

9. The sewing machine of claim 6, wherein:
the verifier includes an input unit that inputs the authentication key data; and
the sewing machine controller calculates the calculated identification data, that is identical to the sewing machine identification data, based on the authentication key data inputted from the input unit.

10. The sewing machine of claim 9, wherein the input unit is composed of a transparent touch panel disposed in a front face of the display.

11. A computer-readable storage medium of a sewing machine, the sewing machine having a sewing machine controller capable of transmitting and receiving data to and from a terminal and that stores sewing machine identification data, the storage medium storing a software program executable by the sewing machine controller, the software program comprising:
instructions for determining whether or not a sewing machine control program received from the terminal is free of charge based on version information of the sewing machine control program;
upon receiving a determination result indicating that the sewing machine control program is not free of charge from the instructions for determining, instructions for generating calculated identification data corresponding to the sewing machine identification data based on authentication key data and verifying the calculated identification data with sewing machine identification data; and
instructions for invoking the sewing machine control program loaded via the terminal when receiving a verification result from the instructions for generating and verifying indicative of consistency between the calculated identification data and the sewing machine identification data.

12. The medium of claim 11, wherein the instructions for determining determines whether or not the sewing machine control program is free of charge by comparing medium identification data received from the terminal with the medium identification data stored in the sewing machine controller.

13. The medium of claim 12, further comprising instructions for controlling a display provided in the sewing machine to display an authentication key data input screen for inputting the authentication key data when the instructions for determining determines that the sewing machine control program is not free of charge.

14. The medium of claim 11, wherein the instructions for generating and verifying include instructions for inputting the authentication key data and calculating the calculated identification data, that is identical to the sewing machine identification data, based on the authentication key data inputted from the instructions for inputting.

* * * * *